H. R. LOVE.
Combination Filterer and Cut-Off.
No. 218,635.　　　　　Patented Aug. 19, 1879.
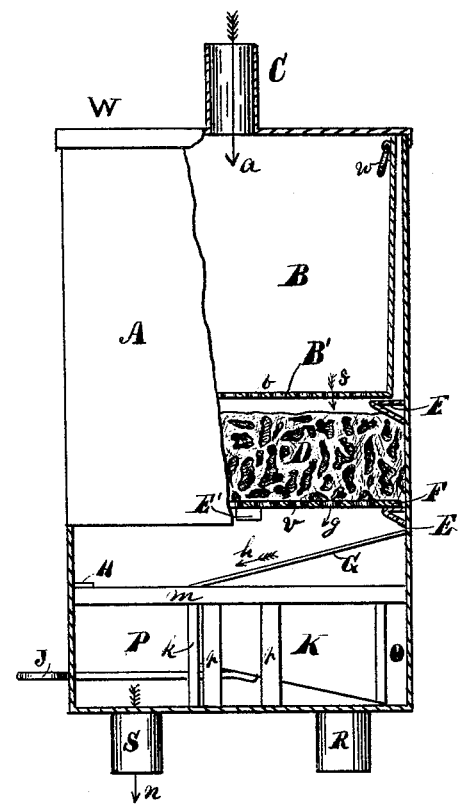
Fig. 1.
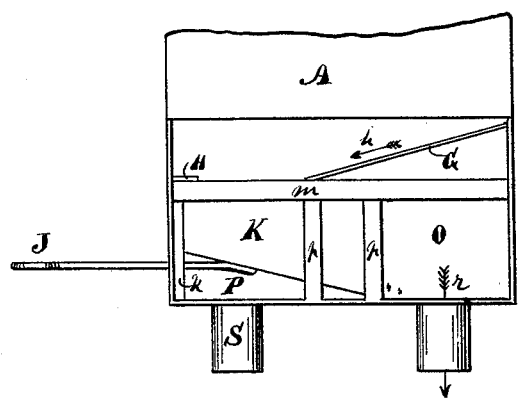
Fig. 2.
Fig. 3.
WITNESSES:
　J. S. Brown
　C. H. Parker
INVENTOR.
　H. R. Love
　Per E. C. Frink
　his Atty

UNITED STATES PATENT OFFICE.

HOLMES R. LOVE, OF CRAWFORDSVILLE, INDIANA.

IMPROVEMENT IN COMBINATION FILTERER AND CUT-OFF.

Specification forming part of Letters Patent No. 218,635, dated August 19, 1879; application filed May 20, 1879.

*To all whom it may concern:*

Be it known that I, HOLMES R. LOVE, of Crawfordsville, in the county of Montgomery and State of Indiana, have invented a new and useful Improvement in Combination Filterer and Cut-Off, of which the following is a description, reference being had to the accompanying drawings.

The object of my invention is to provide a device for filtering water; also to provide a means of conducting the filtered water to a cistern or through a wasteway, as may be required.

My invention consists, first, in the new construction and arrangement of the filtering-box and filtering material; second, in the new construction and arrangement of the cut-off; and, third, in the new combination of newly-constructed elements, as will be hereinafter fully described and set forth.

In the accompanying drawings, in which like letters of reference in the different figures indicate like parts, Figure 1 represents a side elevation, partially in section, of my newly-constructed arranged device for filtering water, showing the arrangement of the filtering devices, and the cut-off in position to permit the water to flow through a waste-pipe. Fig. 2 represents a section of the same, showing the cut-off in position to conduct the water to a cistern or reservoir, and Fig. 3 represents a longitudinal sectional view of the cut-off.

Referring to the drawings, A represents the outer case, provided with a removable cover, W, which may be secured to the case A in any ordinary manner. The cover W is provided with a pipe, C, to form a connection with a leader from the roof of a building.

The case A is provided on the inside with two sets of cleats or projections, E′ below, and E above. The plate F, that rests on the lower cleats or projections, E′, is perforated with a series of holes, v, for the filtered water to pass through, and forms a removable bottom. Above the perforated bottom F is the filterer, composed of charcoal, gravel, and sponge, D. The removable box or tray B is provided with a bottom, B′, which is also perforated with a series of holes, b, and said tray rests on the upper cleats, E, above the filterer. The upper edge of the tray B extends upward near the top of the case A, and is provided with rings or ears w, for lifting it out or putting it into the case A. The partition G is secured in the case A below the perforated plate F, at about the angle shown, and covers a little more than one-half of the case, and is designed to conduct the water into the part marked P of the chamber below.

The cut-off K is constructed with two sides and one end, having an inclined bottom, k′, and downward-projecting standard k, at one end, and is also provided with a rod, J, which extends out through one side of the case A, which forms a means of operating the cut-off, as shown in the drawings. The lower end of the case A is provided with two outlet-pipes, S R, the pipe S being the wasteway, and the pipe R leading to the cistern.

When the cut-off K is moved under the inclined partition G, as shown in Fig. 1, the water that passes through the filtering material in the chamber above is permitted to run down the inclined partition G into that part of the lower chamber marked P, and passes out at the waste-pipe S in the direction of the arrow n.

When it is desired to conduct the filtered water into a cistern or reservoir, then the cut-off K is moved back until its upper rear end comes under the shelf H. Thus the cut-off shuts off the waste-pipe S and opens the pipe R, so that all water passing into the cut-off is conducted into that part of the lower chamber marked O, and runs through the pipe R into the cistern or reservoir, as indicated by the arrow r.

It will be observed that all the water that enters the case A is filtered, whether it is saved or wasted, and that the filtering apparatus is constructed so as to permit it to be readily removed for cleaning, when desired.

I am aware that various patents have been granted for filtering and cut-off devices; but I am not aware that any have been constructed, arranged, and combined to operate and produce results like that shown in my invention.

What I claim as new, and desire to secure by Letters Patent, is—

1. In a filtering and cut-off device, the case A, having two sets of cleats or shelves, E E′, and an inclined partition, G, combined with the perforated plate F, the tray B, also having a perforated bottom, and the filtering-sponge D, as and for the purpose specified.

2. The cut-off K, having upright sides and one end and an inclined bottom, $k'$, one end of which is supported by the standard $k$, combined with the case A, having an inclined partition, G, and shelf H, as and for the purpose specified.

3. The case A, having a filter consisting of charcoal, gravel, and sponge, supported by a perforated removable bottom, F, and having an inclined partition, G, below, combined with the cut-off K, as and for the purpose specified.

In testimony whereof I have signed my name to this specification in the presence of two subscribing witnesses.

HOLMES R. LOVE.

Witnesses:
 JOHN S. BROWN,
 T. H. PARKS.